US010023761B2

(12) United States Patent
Wang et al.

(10) Patent No.: US 10,023,761 B2
(45) Date of Patent: Jul. 17, 2018

(54) COATINGS FOR PLASTIC SUBSTRATES

(71) Applicant: PPG Industries Ohio, Inc., Cleveland, OH (US)

(72) Inventors: Wei Wang, Allison Park, PA (US); Hongying Zhou, Allison Park, PA (US); Kurt Gordon Olson, Gibsonia, PA (US); Jonathan Thomas Martz, Valencia, PA (US); Richard Alan Janoski, Sr., Pittsburgh, PA (US); Leigh Ann Humbert, Pittsburgh, PA (US); David Robert Fenn, Allison Park, PA (US); Terri Lynn Ziegler, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 103 days.

(21) Appl. No.: 14/753,126

(22) Filed: Jun. 29, 2015

(65) Prior Publication Data

US 2016/0376465 A1    Dec. 29, 2016

(51) Int. Cl.
*C09D 153/00* (2006.01)
*B05D 3/00* (2006.01)
*C09D 4/06* (2006.01)

(52) U.S. Cl.
CPC ............ *C09D 153/00* (2013.01); *B05D 3/002* (2013.01); *C09D 4/06* (2013.01)

(58) Field of Classification Search
CPC .................................................. C09D 153/00
See application file for complete search history.

(56) References Cited

U.S. PATENT DOCUMENTS

| 3,394,029 | A | 7/1968 | MacArthur |
| 6,187,854 | B1 | 2/2001 | Spinelli et al. |
| 6,413,306 | B1* | 7/2002 | Kraiter .................. B01F 17/005 |
| | | | 106/31.85 |
| 6,437,040 | B2 | 8/2002 | Anthony et al. |
| 6,576,722 | B2 | 6/2003 | Coca et al. |
| 6,825,290 | B2 | 11/2004 | Adam et al. |
| 7,438,952 | B2 | 10/2008 | Connelly et al. |
| 2003/0100675 | A1 | 5/2003 | Goetz et al. |
| 2003/0187136 | A1 | 10/2003 | Maier et al. |
| 2004/0071871 | A1 | 4/2004 | Queval et al. |
| 2005/0197455 | A1* | 9/2005 | Schang ................ C09D 123/28 |
| | | | 525/88 |
| 2006/0013958 | A1 | 1/2006 | Connelly et al. |
| 2006/0258808 | A1 | 11/2006 | Kania et al. |
| 2008/0305265 | A1 | 12/2008 | Connelly et al. |
| 2009/0042020 | A1 | 2/2009 | Ferencz et al. |
| 2012/0196143 | A1 | 8/2012 | Schellekens et al. |
| 2014/0037975 | A1 | 2/2014 | Schellekens et al. |

FOREIGN PATENT DOCUMENTS

| EP | 0560508 A1 | 9/1993 |
| EP | 1185571 B1 | 3/2005 |
| JP | 5310972 A | 11/1993 |

* cited by examiner

*Primary Examiner* — Jeffrey C Mullis
(74) *Attorney, Agent, or Firm* — Julie M. Meder

(57) ABSTRACT

Disclosed is a coating composition comprising a resinous binder prepared from a reaction mixture comprising (a) a first component; (b) a second component; and (c) a third component comprising a block copolymer having (i) a first block comprising units having functional groups reactive with at least one of the first and second components and (ii) a second block comprising units having functional groups that promote adhesion to a polymeric substrate, provided that the first component, the second component, and the block copolymer differ from each other. The block copolymer may also be used as an additive in a coating composition.

26 Claims, No Drawings

COATINGS FOR PLASTIC SUBSTRATES

FIELD OF THE INVENTION

The present invention relates to coating compositions having adhesion to polymeric substrates.

BACKGROUND OF THE INVENTION

Polymers are used in a wide variety of molded articles for use in the automotive, industrial, and appliance markets, among others. Vehicles, for example, include many interior and exterior parts and attachments that are constructed from polymers, such as minor casings, fenders, bumper covers, spoilers, dashboards, interior trim, and the like. Such articles generally are prepared by molding an article from a polyolefin or other resin and applying to the molded article one or more film-forming coating layers to protect and/or color the article. One of the difficulties associated with the use of polymeric substrates is that typical film-forming compositions used for protective and/or decorative coatings may not adhere. In refinishing molded articles constructed from polymers, for example, addition of an adhesion promoting layer can make the refinishing process complex, time-consuming, and expensive. Coatings and methods to reduce this time and complexity are therefore desired.

SUMMARY OF THE INVENTION

The present invention includes a coating composition comprising a resinous binder prepared from a reaction mixture comprising: (a) a first component; (b) a second component; and (c) a third component comprising a block copolymer having (i) a first block comprising units having functional groups reactive with at least one of the first and second components and (ii) a second block comprising units having functional groups that promote adhesion to a polymeric substrate, provided that the first component, the second component, and the block copolymer differ from each other. Also included in the present invention is a method of treating a plastic substrate comprising (1) cleaning at least a portion of a plastic substrate and (2) applying the above-described coating composition directly onto the cleaned portion, wherein step (2) directly follows step (1) with no steps in between.

The invention also includes a method of treating a plastic substrate comprising (1) cleaning at least a portion of a plastic substrate, (2) treating the cleaned portion with an adhesion promoter, and (3) applying a coating composition directly onto the treated portion, wherein steps (2) and (3) directly follow step (1) with no steps in between steps (1) and (2) or steps (2) and (3), wherein the coating composition comprises a film-forming polymer and wherein at least one of the adhesion promoter and the coating composition comprise an adhesion promoting additive, the adhesion promoting additive comprising a block copolymer comprising (a) a first block and (b) a second block comprising units having functional groups that promote adhesion to the plastic substrate.

The invention also includes a coating composition comprising a film-forming polymer, an adhesion promoter, and a block copolymer. Also included in the present invention is a method of treating a plastic substrate comprising treating at least a portion of a plastic substrate with a coating composition comprising a film-forming polymer, an adhesion promoter, and a block copolymer.

DESCRIPTION OF THE INVENTION

For the purposes of the following detailed description, it is to be understood that the invention may assume various alternative variations and step sequences, except where expressly specified to the contrary. It is also to be understood that the specific compositions and methods described in the following specification are simply exemplary embodiments of the invention. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10

The present invention is generally directed to coating compositions having adhesion to polymeric substrates. Phrases such as "having adhesion" or "promote adhesion" or the like in reference to a composition refer to a feature of that composition that reduces, if not avoids, delamination of a film-forming composition from a substrate, and phrases such as "adhesion promoter" refer to a component that, when included in a composition, promotes adhesion of the composition to a substrate. The present coating compositions generally comprise a block copolymer as an adhesion promoter, wherein one of the blocks of the copolymer comprises units having functional groups that promote adhesion to a polymeric substrate. Methods of treating and/or coating polymeric substrates using these coating compositions are also within the scope of the present invention.

Although reference is made herein to a block copolymer, the block copolymer can have any number of blocks and any number of monomer units. For example, the copolymer can be a diblock copolymer or a triblock copolymer. The block copolymers described herein are described in reference to blocks [A], [B], [C] and the like, each having at least 10 monomeric units, where each of blocks [A], [B] and [C] is different from each other. For example, a diblock copolymer according to the present invention may be referenced as [A]-b-[B], where the symbols [A] and [B] refer to two distinct blocks of the copolymer and the symbol "b" denotes the block structure of block [A] and block [B]. Similarly a triblock copolymer according to the present invention may be referenced as [A]-b-[B]-b-[C] or [A]-b-[C]-b-[B], where the symbols [A], [B] and [C] refer to three distinct blocks and the symbol "b" denotes the block structure of blocks [A], [B] and [C].

A coating composition according to the present invention can comprise a resinous binder prepared from a reaction mixture comprising: (a) a first component; (b) a second component; and (c) a third component comprising a block copolymer having (i) a first block comprising units having functional groups reactive with the first and/or second components and (ii) a second block comprising units having functional groups that promote adhesion to a polymeric substrate, provided that the first component, the second component, and the block copolymer differ from each other. It will be appreciated, therefore, that the block copolymer will react with the first and/or second component. The block copolymer may comprise up to 50 weight percent (wt. %) of the total weight of the first, second, and third components, such as up to 20 wt. % or up to 30 wt. % or up to 40 wt. %.

At least one of the blocks in the block copolymer comprises monomeric units that promote adhesion to a polymeric substrate. The other block or blocks of the block copolymer may be selected for suitable reaction with the first and/or second components to produce a resinous binder and/or to provide desired properties to the resinous binder and/or a coating composition produced therefrom.

The first component (a) and second component (b) may be components of a coating composition that is produced from two components that react when contacted with each other either in ambient conditions or at elevated temperature, such as a polyol and an isocyanate of a polyurethane coating composition. It should be appreciated that the present invention is not limited to a specific two-component coating chemistry. For example, the first component (a) may include hydroxyl functional moieties and the second component (b) may include isocyanate functional moieties. Other reactive functionalities are also within the scope of the invention; for example, the first component may include a polyamine or a polyacid, and the second component may include a species reactive with the functionality on the first component, such as an epoxy, melamine, anhydride alkoxysilane, and the like.

The coating composition according to the present invention may be prepared from a reaction mixture of the first, second and third components, wherein the first and second components react with each other and the first and/or second components react with the first block of the block copolymer to form a resinous binder. As such, the third component comprising the block copolymer may be prepared as a pre-polymer and then the first, second, and third components are subsequently reacted together. For example, where the first component and the third component (the block copolymer) each include functional groups reactive with other functional groups on the second component, the second component should be understood to react with both of the first and third components. By way of a more particular non-limiting example, the first component may include a polyol, the second component may include a polyisocyanate, and the third component includes hydroxyl functional groups (reactive with the polyisocyanate) as well as functional groups that promote adhesion to a polymeric substrate. Upon reaction of all three components together, the resulting resinous binder (a polyurethane) exhibits enhanced adhesion to a polymeric substrate compared to a resinous binder not including the block copolymer.

A first block (an [A] block) of the block copolymer may be produced from monomers reactive with groups present in the first or second component. For example, the first block of the block copolymer may be produced from hydroxyl functional monomers that are reactive with groups present in the second component, such as isocyanate groups. Suitable hydroxyl functional monomers of the first block of the block copolymer that are reactive with isocyanate groups of the second component include hydroxyl functional (meth) acrylic acid alkyl esters such as 2-hydroxyethyl(meth)acrylate, 2-hydroxypropyl(meth)acrylate, 3-hydroxypropyl (meth)acrylate, 4-hydroxybutyl(meth)acrylate, and corresponding acrylates, or an adduct of (meth)acrylic acid/ glycidyl neodecanoate. In addition, other suitable hydroxyl containing monomers that may be used include ethylene glycol allyl ether, propylene glycol allyl ether, butylene glycol allyl ether, diethylene glycol allyl ether, cyclomethylol propene allyl ether and hydroxymethylnorbornene, allyl alcohol, methyl allyl alcohol, propyl alcohol and unsaturated fatty alcohols. The first block may comprise hydroxyl functional methacrylic acid alkyl esters. Alternatively, the first block of the block copolymer may be produced from amine functional monomers that are reactive with groups present in the second component, such as isocyanate groups. Suitable amine functional monomers of the first block of the block copolymer that are reactive with isocyanate groups of the second component include polyamines having at least two functional groups such as di-, tri-, or higher functional polyamines, which may be aromatic and/or aliphatic.

A second block (a [B] block) of the block copolymer includes units having functional groups that promote adhesion to a polymeric substrate, such units including but not limited to cycloalkyl(meth)acrylate or aryl(meth)acrylate units, such as isobornyl(meth)acrylate, isodecyl(meth)acrylate, lauryl(meth)acrylate, tridecyl(meth)acrylate, tetradecyl (meth)acrylate, hexadecyl(meth)acrylate, octadecyl(meth) acrylate, stearyl (meth)acrylate, dicyclopentenyloxymethyl (meth)acrylate, benzyl(meth)acrylate, 2-phenoxyethyl (meth)acrylate, 3,3,5-trimethyl-cyclohexyl(meth)acrylate, 3-methylphenyl(meth)acrylate, 1-naphtyl(meth)acrylate, 3-phenyl-n-propyl(meth)acrylate and 2 phenyl-aminoethyl (meth)acrylate, C6 to C20 optionally substituted alkyl(meth) acrylamide monomers such as t-octyl(meth)acrylamide and n-decyl(meth)acrylamide, vinylic monomers such as vinyl toluene, vinyl esters of versatic acid such as VEOVA® 9 or VEOVA® 10, vinyl chloride and vinylidene chloride, and mixtures thereof.

The block copolymer of the present invention may further include a third block, a [C] block, which may be comprised of monomers similar to those in [A] block or [B] block and/or include (meth)acrylic acid units. For triblock copolymers having a [C] block, the blocks may be arranged as [A]-b-[B]-b-[C] or [A]-b-[C]-b-[B].

The block copolymer (e.g. diblock or triblock) may be produced via controlled radical polymerization of at least one ethylenically unsaturated monomer via a reverse addition-fragmentation chain transfer (RAFT) mechanism, atom transfer radical polymerization (ATRP) or nitroxide mediated polymerization (NMP) technique. It is to be understood that the first, second, and, if used, third blocks of the block copolymer may be produced in any order (sequence), and that one of the blocks may be reactive with the first and/or second component, while another of the blocks has functional groups that promote adhesion to a polymeric substrate.

A coating composition according to the present invention can also comprise the above-described block copolymer of the present invention (diblock or triblock) as an adhesion promoting additive in a coating composition. As used herein, an "additive" is a component of a composition that may or may not react with other components of the composition.

Likewise, "an adhesion promoting additive" is a component of a composition which may or may not react with other components of the composition and which promotes adhesion of the composition to a substrate, such as the block copolymer adhesion promoting additive described herein. As such, the present invention also includes a coating composition comprising a film-forming polymer and the block copolymer of the present invention, wherein the block copolymer may or may not react with the film-forming polymer, meaning that some deminimus reaction between the block copolymer adhesion promoting additive and film-forming polymer may or may not occur. One block of the block copolymer adhesion promoting additive includes the second block (the [B] block) described above having units with functional groups that promote adhesion to a polymeric substrate such as those described above. One or more blocks of the block copolymer adhesion promoting additive may include the first block (the [A] block) and/or the third block (the [C] block) described above.

By "film-forming polymer" it is meant a polymer that can form a self-supporting continuous film on at least a horizontal surface of a substrate upon removal of any diluents or carriers in the composition or upon curing at ambient or elevated temperatures. The coating composition of the present invention including the block copolymer as an adhesion promoting additive exhibits enhanced adhesion to a polymeric substrate compared to a coating composition not including the block copolymer adhesion promoting additive.

The film-forming polymer may be a thermoplastic and/or thermosetting polymer and may be waterborne or solvent-based.

As used herein, the term "thermosetting" refers to polymeric compositions that "set" irreversibly upon curing or crosslinking, wherein the polymer chains of the polymeric components are joined together by covalent bonds. This property is usually associated with a crosslinking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. Suitable thermosetting film-forming polymers include, for example, acrylic polymers, polyvinyl polymers, phenolics, polyester polymers, polyurethane polymers, polyamide polymers, polyether polymers, polysiloxane polymers, copolymers thereof, and mixtures thereof.

As used herein, the term "thermoplastic" refers to polymeric compositions that comprise polymeric components that are not joined by covalent bonds and thereby can undergo liquid flow upon heating and are soluble in solvents. Suitable thermoplastic film-forming polymers include, but are not limited to, acrylic polymers, thermoplastic polyolefins, such as polyethylene, polypropylene, polyamides, such as nylon, thermoplastic polyurethanes, thermoplastic polyesters, vinyl polymers, polycarbonates, acrylonitrile-butadiene-styrene ("ABS") copolymers, ethylene propylene diene terpolymer ("EPDM") rubber, copolymers, and mixtures of any of the foregoing. Generally these polymers can be any polymers of these types made by any method known to those skilled in the art. Such polymers may be solvent borne or water dispersible, emulsifiable, or of limited water solubility.

The film-forming polymer may be a primer composition and/or a basecoat composition. By "primer composition" (also referred to as a "sealer") it is meant a coating composition designed to adhere to substrates and function as a binding layer between the substrate and an overlying coating composition, such as a basecoat composition. By "basecoat composition" it is meant a coating composition that typically is applied over a primer composition and may include components (such as pigments and/or flake material) that impact the color and/or visual effects of the basecoat composition.

The coating composition including the block copolymer as an adhesion promoting additive may further include another adhesion promoter such as a polyolefin additive, where the polyolefin additive promotes adhesion of the coating composition to a substrate. The polyolefin additive may or may not be chlorinated. Suitable chlorinated polyolefins (CPOs) are those available commercially from Nippon Paper Chemicals under the trade designations SUPERCHLON E-723, E-673, and/or E-503, and suitable non-chlorinated polyolefins are commercially available from Eastman under the trade name ADVANTIS 510W and/or those available commercially from Nippon Paper Chemicals under the trade names AUROREN AE 201 and/or AE-301.

The block copolymer adhesion promoting additive and the other adhesion promoter (e.g., CPO), if used, may be provided as separate additions to the coating composition or together as a premixture or as a composite material. By "composite material", it is meant to include a structure wherein the block copolymer of the present invention at least partially encapsulates the adhesion promoter additive.

As used herein, the term "encapsulated" refers to a feature of particles of the other adhesion promoter that are at least partially enclosed by (i.e. covered by) the block copolymer to an extent sufficient to physically separate particles of the other adhesion promoter from each other within a dispersion, which may be aqueous or solvent based, thereby preventing agglomeration of the other adhesion promoter. It will be appreciated that dispersions of the composite material of the present invention may also include an adhesion promoter that is not encapsulated within the block copolymer. Encapsulation, or at least partial encapsulation, of the other adhesion promoter in the block copolymer of the present invention may be accomplished by adding the other adhesion promoter into a block copolymer solution with solvent(s) in which the other adhesion promoter may not be dissolved in at room temperature.

The concentration of block copolymer adhesion promoting additive in a coating composition of the present invention may be up to 40 wt. % or up to 30 wt. % or up to 20 wt. %. The block copolymer as described herein above may be used as an adhesion promoting additive in a concentration of at least 1 wt. % or at least 2 wt. % or at least 3 wt. % or at least 4 wt. % or at least 5 wt. % or at least 10 wt. % or at least 20 wt. %. The block copolymer as described herein above may be used as an adhesion promoting additive in a concentration of 1 to 40 wt. % or 5 to 30 wt. % based on the total solids in the coating composition.

The concentration of the other adhesion promoter in a coating composition of the present invention may be up to 10 wt. % or up to 5 wt. % or up to 1 wt. %. The other adhesion promoter (e.g., CPO) may be used as an additive in a concentration of at least 0.5 wt. % or at least 1 wt. % or at least 5 wt. %. The other adhesion promoter as described herein above may be used in a concentration of 0.5 to 10 wt. % or 1 to 5 wt. % based on the total solids in the coating composition.

The present invention is further directed to treating a polymeric substrate comprising applying to at least a portion of the substrate a coating composition as described above. Particularly suitable polymeric substrates for use with the coating compositions of the present invention include plastic substrates. As used herein, the term "plastic" includes any thermoplastic or thermosetting synthetic nonconductive material used in injection or reaction molding, sheet molding, or other similar processes whereby parts are formed, such as, for example, acrylonitrile butadiene styrene ("ABS"), thermoplastic polyolefin ("TPO"), polycarbonate, thermoplastic elastomer, polyester thermoset, polyurethane, thermoplastic polyurethane, sheet molded compound, and fiberglass reinforced polyester, among others. Common examples of polyolefins are polypropylene, polyethylene, and polybutylene and include the class of thermoplastic polyolefin. TPO generally refers to polymer/filler blends usually including some fraction of PP (polypropylene), PE (polyethylene), BCPP (block copolymer polypropylene), rubber, and a reinforcing filler. Common fillers include, though are not restricted to talc, fiberglass, carbon fiber, wollastonite, and MOS (metal oxy sulfate). Common rubbers include EPR (ethylene propylene rubber), EPDM (EP-diene rubber), EO (ethylene-octene), EB (ethylbenzene), and SEBS (styrene-ethylene-butadiene-styrene).

In treating a polymeric substrate, the coating composition of the present invention having the block copolymer as a reactant of the resinous binder therein is suitable for use as a primer composition applied directly to a polymeric substrate and promoting adhesion thereto. In use, the first, second and third components are blended together. The blended reactants (which may include a non-reactive adhesion promoter, such as a polyolefin, e.g. CPO) are deposited onto the polymeric substrate by any conventional method including brushing, dipping, flow coating, spraying and allowed to cure at ambient conditions or at elevated temperature, as needed for curing the coating composition. The substrate may be pre-cleaned prior to deposition of the coating composition. The cleaning step refers to the removal of unwanted foreign matter from the surface, such as soil, dirt, cutting oils, waxes, finger oils, and sanding dust, among other things. The substrate may be cleaned by, for example, mechanically separating the unwanted matter from the substrate, dissolving the unwanted foreign matter, contacting the substrate with a detergent, or a combination of two or more of these methods. As used herein, the term "detergent" refers to a substance that reduces the surface tension of water, i.e., a surface-active agent or a surfactant, which concentrates at oil-water interfaces, exerts emulsifying action, and aids in removing contaminants from a surface. Examples of detergents that might be used in the practice of the present invention include, without limitation, the anionic, nonionic, and cationic surfactants described earlier, as well as soaps. For example, the detergent may include d-Limonene, an oil extracted from citrus rind. The detergent may be provided in a cleaning composition, in which the detergent may, for example, comprise 0.01 to 10.0 percent by weight, or 0.1 to 0.5 percent by weight, or 0.1 to 0.3 percent by weight of the cleaning composition based on the total weight thereof. The amount of detergent present in the cleaning composition can range between any combination of the recited values, inclusive of the recited values.

Cleaning of the substrate may include contacting the substrate with an object, such as a pad or sponge, having a cleaning composition comprising a detergent in contact with or absorbed therein. The step of cleaning the substrate may include contacting the substrate with an abrasive material having a cleaning composition comprising a detergent contained therein. Abrasive materials suitable for use in the methods and systems of the present invention are commercially available and include, for example, SCOTCH-BRITE™ Scuff Sponges, commercially available from 3M Company, St. Paul, Minn., and BEAR-TEX® Scuff Pads and Sponges, commercially available from Norton Abrasives.

In contrast to conventional practice, the coating composition of the present invention having the block copolymer as a reactant of the resinous binder therein is applied directly to the cleaned substrate, with no other treatment of the substrate, other than optional cleaning thereof. In this manner, conventional pre-treatment steps of wiping the substrate one or more times with a solvent and/or treatment of the substrate with a composition containing CPO are avoided. According to the present invention, a polymeric substrate may be treated by cleaning at least a portion of the substrate and applying the composition of the present invention having the block copolymer as a reactant of the resinous binder therein directly on to the cleaned portion of the substrate.

The coating composition including the block copolymer as an adhesion promoting additive is also suitable for use as a primer composition applied directly to a substrate (which may or may not be pre-cleaned) and promoting adhesion thereto. A polymeric substrate may be treated by first cleaning at least a portion of the polymeric substrate as described above. Directly thereafter, the cleaned portion is treated with an adhesion promoter, such as a polyolefin (e.g. CPO), which is dried, such as by flashing. The coating composition including the block copolymer as an adhesion promoting additive is applied directly onto the treated portion of the substrate. The treating step and applying step directly follow the cleaning step with no steps in between the cleaning and treating steps and or between the treating and applying steps. Alternatively, the coating composition including the block copolymer as an adhesion promoting additive and further comprising another adhesion promoter, such as a polyolefin (e.g. CPO), may be applied directly to a cleaned polymeric substrate or an untreated polymeric substrate. By "untreated", it is meant that the substrate has not been pre-cleaned with a detergent, solvent, or CPO or the like. In this manner, the conventional steps of multiple CPO wipes may be avoided.

In another aspect of the invention, the block copolymer may be used as an adhesion promoter. For example, a polymeric substrate may be treated by first cleaning at least a portion of the polymeric substrate as described above. Directly thereafter, the cleaned portion is treated with an adhesion promoter comprising the block copolymer alone or in combination with a material such as a polyolefin (e.g. CPO), which is dried. A coating composition applied thereover may or may not include the block copolymer as a reactive or non-reactive component of the coating composition.

The coating compositions of the present invention may be used as a primer composition and/or a basecoat composition in a multi-layered coating system. As such, further coating compositions may be applied to the coating compositions of the present invention. Examples of such further coating compositions include protective and/or decorative coating systems, such as basecoat compositions and/or clearcoat compositions and/or colored coating compositions, as described below.

Protective and/or decorative coating systems that may be used in the present invention include, for example, those protective and/or decorative coating systems that are conventionally used in automotive refinish coating applications and automotive OEM applications, among others. Examples of suitable protective and/or decorative coating systems include single-layer coating systems, such as pigmented direct gloss coating systems, and multi-layered systems, such as systems that include a pigmented basecoat layer and a clear top coating layer. One or more layers of the protective and/or decorative coating system may be deposited from a coating composition that includes a polymeric composition that includes, without limitation, hydroxyl or carboxylic acid-containing acrylic copolymers, hydroxyl or carboxylic acid-containing polyester polymers and oligomers, isocyanate or hydroxyl-containing polyurethane polymers, and/or amine or isocyanate-containing polyureas. The one or more layers of the protective and/or decorative coating system may be deposited from a coating composition that includes one or more other additive ingredients, including those which are well known in the art of formulating surface coatings, such as dyes, pigments, surfactants, flow control agents, thixotropic agents, fillers, anti-gassing agents, organic co-solvents, catalysts, and other customary auxiliaries.

The coating compositions of the present invention may be used in refinishing of plastic articles. As used herein, the term "refinishing" refers to the act of restoring or repairing the surface or finish of an article or, in the case of automobile repairs, for example, the preparation of the surface or finish of an uncoated replacement article in connection with such a repair.

Illustrating the invention are the following examples that are not to be considered as limiting the invention to their details. All parts and percentages in the examples, as well as throughout the specification, are by weight unless otherwise indicated

EXAMPLES

Test Methods

The coatings produced in the Examples herein were tested for adhesion in a cross hatch adhesion test and/or a jet wash test.

The cross hatch adhesion test was performed using a template to cut at least 11 parallel lines 2 mm apart that is placed upon the applied cured coating layers. With the retractable knife perpendicular to the panel surface, 11 parallel lines were cut through to the substrate surface using the 2 mm spacing template. The template was repositioned to make additional cuts at 90 degrees to the first set and cut as described above to create a grid of 100 squares. The film was lightly brushed with a soft brush or tissue to remove any detached flakes or ribbons of coatings. A 75 mm (3 inch) long piece of tape (3M#898 or equivalent) was placed over the scribed lines in the same direction as one set of the lines. The taped was smoothed firmly over the substrate with an eraser or the backside of the blade-holder handle. The tape was then pulled off in one rapid, continuous motion while keeping the tape as close as possible to 60°. The result was reported as the percentage adhesion of the test panel, e.g. no failure would be recorded as 100 percent adhesion or pass.

The jet wash test was performed to measure the resistance of coatings to the action of high pressure/hot water jet washer. A paint film was incised with a General #88 scriber to form a cross. The incisions were deep enough to cut into the substrate and be approximately 4 inches in length and were at least ¼ inch from all edges of the panel. Any paint or plastic shards caused by the cutting were wiped away or gently scraped. A panel was fastened into the jet wash chamber and the nozzle of the jet wash machine was positioned in the center of the cross, with the jet parallel to one of the branches. The jet washer was started and position maintained. The following test conditions were used:

Pressure: 80 bars
Temperature: 60° C. at the nozzle
Target distance: 10 cm
Test of test: 60 seconds
Spray nozzle fan jet angle: 25° nozzle 2506
Angle of impact: 90°
The result is recorded. A "Pass" indicates no peeling of the coating on the cross. A "Fail" indicates partial or total delamination.

Example 1

Triblock Copolymer 1 Synthesis

A triblock copolymer was prepared having a first block comprising acrylic acid, a second block comprising isobornyl acrylate, and a third comprising hydroxyethyl acrylate and butyl acrylate.

Part A

The first block (Block [A]) was prepared using the materials listed in Table 1. Charge #1 was added into a 1 L four-necked glass flask equipped with a condenser, temperature measuring probe, mechanical stifling device, and monomer/initiator feeding inlet. The mixture was degas sed by purging with nitrogen at room temperature for 15 minutes while stifling. Then the mixture was heated to 70° C., and, at 70° C., 10% (by weight) of Charge #3 was charged into the reactor and then followed by Charge #2. The reaction mixture was held at 70° C. for 15 minutes. After holding, the rest of Charge #3 was fed over 3 hours at 70° C., and then the reaction mixture was held at 70° C. until the solids stalled. The final solids were experimentally measured at 32.3%, and the weight averaged molecular weight (Mw) was 945 g/mol and polydispersity was 1.7 (measured by gel permeation chromatography using polystyrene standards).

TABLE 1

| Ingredients | Parts by Weight |
|---|---|
| Charge #1 | |
| methyl α-(O-ethyl xanthyl) propionate[1] | 49.00 |
| Ethanol | 297.50 |
| Charge #2 | |
| V501[2] | 2.07 |
| Ethanol | 43.75 |
| Charge #3 | |
| Acrylic acid | 344.75 |
| Ethanol | 399.00 |

[1]Synthesized according to US 2010/0315588A1, Example 1, ethyl-2-bromo propionate replaced by methyl-2-bromopropionate
[2]4,4'-azobis(4-cyanovaleric acid), available from Wako Chemicals

Part B

The second block (Block [B]) was prepared with the materials listed in Table 2. Charge #1 was added into a 2 L four-necked glass flask equipped with a condenser, temperature measuring probe, mechanical stifling device, and monomer/initiator feeding inlet. The mixture was degas sed by purging with nitrogen at room temperature for 15 minutes while stifling. Then the mixture was heated to 70° C., and, at 70° C., 10% (by weight) of Charge #3 was charged into the reactor and then followed by Charge #2. The reaction mixture was held at 70° C. for 15 minutes. After holding, the rest of Charge #3 was fed over 3 hours at 70° C., and then the reaction mixture was held at 70° C. until the solids stalled. The final solids of the resulting diblock copolymer [A]-b-[B] were experimentally measured at 51.0%, and the weight averaged molecular weight (Mw) was 9781 g/mol and polydispersity was 2.5 (measured by gel permeation chromatography using polystyrene standards).

TABLE 2

| Ingredients | Parts by Weight |
|---|---|
| Charge #1 | |
| Block [A] synthesized in Part A | 138.87 |
| Methyl ethyl ketone | 60.00 |
| Charge #2 | |
| V501 | 1.30 |
| Methyl ethyl ketone | 20.00 |
| Charge #3 | |
| Isobornyl acrylate | 444.38 |
| Methyl ethyl ketone | 350.00 |

Part C

The third block was prepared using the materials listed in Table 3. Charge #1 was added into a 2 L four-necked glass flask equipped with a condenser, temperature measuring probe, mechanical stifling device and monomer/initiator feeding inlet. The mixture was degas sed by purging with nitrogen at room temperature for 15 minutes while stirring. Then the mixture was heated to 70° C., and, at 70° C., 10% (by weight) of Charge #3 was charged into the reactor and then followed by Charge #2. The reaction mixture was held at 70° C. for 15 minutes. After holding, the rest of Charge #3 was fed over 4 hours at 70° C., and then the reaction mixture was held at 70° C. until the solids stalled. The final solids of the triblock copolymer were experimentally measured at 51.0%, and the weight averaged molecular weight (Mw) was 11489 g/mol and polydispersity was 4.7 (measured by gel permeation chromatography using polystyrene standards).

TABLE 3

| Ingredients | Parts by Weight |
|---|---|
| Charge #1 | |
| Diblock Copolymer synthesized in Part B | 450.00 |
| Methyl ethyl ketone | 30.00 |
| Charge #2 | |
| V501 | 0.17 |
| Methyl ethyl ketone | 20.00 |
| Charge #3 | |
| Hydroxyethyl acrylate | 28.69 |
| Butyl acrylate | 28.69 |
| Methyl ethyl ketone | 60.00 |

Example 2

Solvent Borne Primer With Triblock Copolymer 1

A sheet of thermoplastic polyolefin was cleaned with an aliphatic hydrocarbon solvent mixture and coated with a two-component isocyanate based primer composition (commercially available from PPG Industries, Inc. in Europe as product D8505/DP4000) including as a reactant 20 wt. % Triblock Copolymer 1 of Example 1. The coating was post cured at room temperature for 24 hours and then subjected to a cross hatch adhesion test as reported in Table 4.

The results reported in Table 4 show that the coating composition of the present invention having the block copolymer as a reactant of the resinous binder passed the cross hatch adhesion testing, while a control coating composition (without the triblock copolymer) failed.

TABLE 4

| Panels | Cross hatch adhesion |
|---|---|
| Coating with Triblock Copolymer 1 of Ex. 1 | Pass |
| Control coating | Fail |

Example 3

Triblock Copolymer 2 Synthesis

A triblock copolymer was prepared having a first block comprising acrylic acid, a second block comprising isobornyl acrylate, and a third block comprising butyl acrylate.

Parts A and B of Example 1 were repeated to produce a diblock copolymer. The third block was prepared with the materials listed in Table 5. Charge #1 was added into a 3 L four-necked glass flask equipped with condenser, temperature measuring probe, mechanical stirring device, and monomer/initiator feeding inlet. The mixture was degassed by purging with nitrogen at room temperature for 15 minutes while stifling. Then the mixture was heated to 70° C., and, at 70° C., 10% (by weight) of Charge #3 was charged into the reactor and then followed by Charge #2. The reaction mixture was held at 70° C. for 15 minutes. After holding, the rest of Charge #3 was fed over 4 hours at 70° C., and then the reaction mixture was held at 70° C. until the solids stalled. The final solids were experimentally measured at 60.9%, and the weight averaged molecular weight (Mw) was 15254 g/mol and polydispersity was 5.0 (measured by gel permeation chromatography using polystyrene standards).

TABLE 5

| Ingredients | Parts by Weight |
|---|---|
| Charge #1 | |
| Diblock Copolymer of Example 1, Part B | 906.18 |
| Methyl ethyl ketone | 160 |
| Charge #2 | |
| V501 | 1.3 |
| Methyl ethyl ketone | 40.00 |
| Charge #3 | |
| Butyl acrylate | 423.95 |
| Methyl ethyl ketone | 160.00 |

Example 4

Aqueous Dispersion of Triblock Copolymer 2

A dispersion of the Triblock Copolymer 2 of Example 3 in deionized water was prepared with the materials listed in Table 6. Charge #1 was added into a 1 L four-necked glass flask equipped with condenser, temperature measuring probe, mechanical stirring device, and monomer/initiator feeding inlet. Charge #2 was added into the flask slowly with mixing. After Charge #2 was finished, Charge #3 was fed into the flask slowly with mixing. After a stable dispersion was formed, the mixture was heated to 50° C., and vacuumed off the solvent which came with block copolymer 2. After stripping off all of the solvent, a stable dispersion at 31% solids with translucent color was obtained.

TABLE 6

| Ingredients | Parts by Weight |
|---|---|
| Charge #1 | |
| Triblock Copolymer 2 of Example 3 | 200 |
| Charge #2 | |
| Triethylamine | 25.66 |
| Charge #3 | |
| De-ionized water | 400 |

Example 5

Waterborne Basecoat With Triblock Copolymer 2 Additive

Thermoplastic polyolefin ("TPO") substrates were pre-cleaned with an aliphatic hydrocarbon mixture, and then were wiped with a chlorinated polyolefin solution and the solvent was allowed to flash off. The Triblock Copolymer 2 Dispersion of Example 4 was included as an additive at 10 wt. % in a waterborne basecoat Envirobase HP Chrysler PS2, commercially available from PPG Industries, Inc. The mixture was then applied with a SATA jet 3000 WSB nozzle to achieve complete opacity. After ambient dehydration, two coats of DS4000 clearcoat (commercially available from PPG Industries, Inc.) were applied. After 10 minutes of ambient solvent flash, the final coat was baked at 60° C. for 30 minutes.

Cross hatch adhesion and jet wash test were performed after 7 days ambient cure as reported in Table 7. The coating composition of the present invention including the block copolymer as an additive exhibited superior performance compared to a control coating composition without the additive.

TABLE 7

| Panels | Cross hatch adhesion | Jet wash test |
|---|---|---|
| Basecoat with Triblock Copolymer 2 Dispersion of Example 4 | Pass | Pass |
| Control basecoat | Pass | Fail |

Example 6

Triblock Copolymer 3 Synthesis

A triblock copolymer was prepared having a first block comprising acrylic acid, a second block comprising isobornyl acrylate, and a third comprising hydroxyethyl acrylate and butyl acrylate.

Part A

A first block (Block [A]) was prepared using the materials listed in Table 8. Charge #1 was added into a 1 L four-necked glass flask equipped with condenser, temperature measuring probe, mechanical stifling device, and monomer/initiator feeding inlet. The mixture was degas sed by purging with nitrogen at room temperature for 15 minutes while stirring. Then, the mixture was heated to 70° C., and at 70° C., Charge #2 and Charge #3 were co-fed over 3 hours. After the feeds were complete, the reaction mixture was held at 70° C. until the solids stalled. The final solids were experimentally measured at 44.32%, and the weight averaged molecular weight (Mw) was 2339 g/mol and polydispersity was 2.1 (measured by gel permeation chromatography using polystyrene standards).

TABLE 8

| Ingredients | Parts by Weight |
|---|---|
| Charge #1 | |
| Methyl ethyl ketone | 400.00 |
| Ethanol | 400.00 |
| Charge #2 | |
| Acrylic acid | 560 |
| BLOCBUILDER DB ®[3] | 80 |
| Charge #3 | |
| VAZO ™ 67[4] | 7.28 |
| Methyl ethyl ketone | 80 |
| Ethanol | 80 |

[3]Dibenzyl trithiocarbonate (DBTTC), a RAFT agent available from Arkema Inc.
[4]2,2'-azobis(2-methylbutyronitrile), available from E.I. du Pont de Nemours and Company Part B The second block (Block [B]) was prepared with the materials listed in Table 9. Charge #1 was added into a 3 L four-necked glass flask equipped with condenser, temperature measuring probe, mechanical stifling device, and monomer/initiator feeding inlet. The mixture was degas sed by purging with nitrogen at room temperature for 15 minutes while stifling. Then the mixture was heated to 70° C., and, at 70° C., 10% (by weight) of Charge #3 was charged into the reactor and then followed by Charge #2. The reaction mixture was held at 70° C. for 15 minutes. After holding, the rest of Charge #3 was fed over 3 hours at 70° C., and then the reaction mixture was held at 70° C. until the solids stalled. The final solids of the diblock copolymer [A]-b-[B] were experimentally measured at 55.06%, and the weight averaged molecular weight (Mw) was 6989 g/mol and polydispersity was 2.2 (measured by gel permeation chromatography using polystyrene standards).

TABLE 9

| Ingredients | Parts by Weight |
|---|---|
| Charge #1 | |
| Block [A] synthesized in Part A | 246.00 |
| Methyl ethyl ketone | 92.25 |
| Ethanol | 92.25 |

TABLE 9-continued

| Ingredients | Parts by Weight |
|---|---|
| Charge #2 | |
| VAZO ™ 67 | 1.32 |
| Methyl ethyl ketone | 18.45 |
| Ethanol | 18.45 |
| Charge #3 | |
| Isobornyl acrylate | 661.6 |
| Methyl ethyl ketone | 184.5 |
| Ethanol | 184.5 |

Part C

The third block (Block [C]) was prepared with the materials listed in Table 10. Charge #1 was added into a 3 L four-necked glass flask equipped with condenser, temperature measuring probe, mechanical stifling device, and monomer/initiator feeding inlet. The mixture was degas sed by purging with nitrogen at room temperature for 15 minutes while stifling. Then the mixture was heated to 70° C., and, at 70° C., Charge #2 and #3 were fed over 2 hours, and then held at 70° C. for 1 hour. After holding, Charge #4 was added into the flask over 10 minutes, and then the reaction mixture was held at 70° C. until solids production stalled. The final solids was experimentally measured at 51.89%, and the weight averaged molecular weight (Mw) was 8261 g/mol and polydispersity was 3.5 (measured by gel permeation chromatography using polystyrene standards).

TABLE 10

| Ingredients | Parts by Weight |
|---|---|
| Charge #1 | |
| Diblock Copolymer [A]-b-[B] synthesized in Part B | 1100 |
| Methyl ethyl ketone | 161.79 |
| Charge #2 | |
| VAZO ™ 67 | 0.45 |
| Methyl ethyl ketone | 81.53 |
| Charge #3 | |
| Hydroxyethyl acrylate | 75.71 |
| Butyl acrylate | 75.71 |
| Methyl ethyl ketone | 81.53 |
| Charge #4 | |
| VAZO ™ 67 | 0.45 |
| Methyl ethyl ketone | 10.00 |

Example 7

Triblock Copolymer 3 With CPO Additive

A mixture of Triblock Copolymer 3 with chlorinated polyolefin was prepared with the materials listed in Table 11. Charge #1 was added into a 1 L four-necked glass flask equipped with condenser, temperature measuring probe, mechanical stifling device, and monomer/initiator feeding inlet. The mixture was heated to 70° C., and, at 70° C., Charge #2 was added into the flask. The mixture was held at 70° C. until the SUPERCHLON® 930S was totally dissolved. Charge #3 was added into the flask, and then the mixture was cooled to 40° C., and 160 grams solvent was stripped out at lower pressure. The solids content of the final resin solution was 19.5%.

TABLE 11

| Ingredients | Parts by Weight |
|---|---|
| Charge #1 | |
| Triblock Copolymer 3 of Example 6 | 200.00 |
| Toluene | 100.00 |
| Charge #2 | |
| SUPERCHLON® 930S[5] | 25.95 |
| Charge #3 | |
| Butyl acetate | 510.00 |

[5]100% solids chlorinated polyolefin, 100% solids, available from Nippon Paper Chemicals Co. Ltd.

Example 8

Solvent Borne Primer With Triblock Copolymer 3 and CPO Additive

Thermoplastic polyolefin substrates were pre-cleaned with an aliphatic hydrocarbon mixture. A two-component isocyanate based primer composition, ECS25, commercially available from PPG Industries, was prepared using the material of Example 7 (20 wt. % Triblock Copolymer 3 as a reactant), and the primer was applied to the pre-cleaned substrates. The primer was cured at ambient temperature for 30 minutes and then coated with a basecoat, Envirobase HP Chrysler PS2, commercially available from PPG Industries, and a clearcoat, DC4010, commercially available from PPG Industries, applied as "wet on wet" layers, which were then were baked in a single curing step at 60° C. for 20 minutes.

After 7 days' ambient cure, cross hatch adhesion testing and jet wash test were performed as reported in Table 12. The primer with triblock copolymer and chlorinated polyolefin additive passed both the cross hatch adhesion and jet wash tests, while a primer control (without the triblock copolymer and chlorinated polyolefin additive) failed on both tests.

TABLE 12

| Panels | Cross hatch adhesion | Jet wash test |
|---|---|---|
| Primer with Triblock Copolymer/CPO Additive of Example 7 | Pass | Pass |
| Control primer | Fail | Fail |

Example 9

Aqueous Dispersion of Diblock Copolymer With CPO Additive

A dispersion was produced from the materials listed in Table 13 by placing Charge #1 into a 1 L flask, and then vacuuming off methyl ethyl ketone and ethanol brought by the block copolymer from Part B of Example 1. After over 90% of the methyl ethyl ketone and ethanol were stripped off, Charge #2 was added into the flask and then the mixture was heated to 70° C. until totally dissolved. After totally dissolved, Charge #3 was added into the mixture, and then followed by Charge #4. Charge #=was added into the mixture with mixing. The solvents were vacuumed off, and a stable dispersion at 13% solids content was obtained.

TABLE 13

| Ingredients | Parts by Weight |
| --- | --- |
| Charge #1 | |
| Diblock Copolymer of Example 1, Part B | 100 |
| Toluene | 150 |
| Charge #2 | |
| SUPERCHLON ® 930S | 10 |
| Charge #3 | |
| Triethyl amine | 20 |
| Charge #4 | |
| DOWANOL PM | 159 |
| Charge #5 | |
| De-ionized water | 370 |

Example 10

Waterborne Basecoat With Diblock Copolymer and CPO Additives

Thermoplastic polyolefin substrates were cleaned with aliphatic hydrocarbon substrates, and then BYK-3560 (an adhesion promoter available from BYK USA Inc.) was wiped onto the substrates to increase the surface energy. The material of Example 9 was added into a waterborne basecoat, Envirobase HP Chrysler PS2, commercially available from PPG Industries, at 20% based on total weight, and applied to the pre-cleaned substrates to full opacity. The final coatings were baked at 60° C. for 30 minutes after clearcoat, DC4010, commercially available from PPG Industries, was applied. Cross hatch adhesion testing was done at 20 hours and 5 days post cure as reported in Table 14. With the Block Copolymer/CPO Dispersion of Example 9 added into the basecoat, cross hatch adhesion passed, while a basecoat without the additive (control) failed.

TABLE 14

| Panels | Cross hatch adhesion |
| --- | --- |
| Basecoat with Diblock Copolymer/CPO Additive of Example 9 | Pass |
| Control basecoat | Fail |

Example 11

Aqueous Dispersion of Triblock Copolymer With CPO

A dispersion was produced from the materials listed in Table 15 by placing Charge #1 into a 1 L flask, and then vacuuming off methyl ethyl ketone and ethanol brought by Triblock Copolymer 1 from Example 1. After over 90% of the methyl ethyl ketone and ethanol were stripped off, Charge #2 was added into the flask and then the mixture was heated to 70° C. until totally dissolved. After totally dissolved, Charge #3 was added into the mixture, and then followed by Charge #4. Charge #5 was added into the mixture with mixing. And then all of the solvents were vacuumed off, and a stable dispersion at 27.7% solids content was obtained.

TABLE 15

| Ingredients | Parts by Weight |
| --- | --- |
| Charge #1 | |
| Triblock Copolymer 1 of Example 1 | 100 |
| Toluene | 150 |
| Charge #2 | |
| SUPERCHLON ® 930S | 13 |
| Charge #3 | |
| Triethyl amine | 13 |
| Charge #4 | |
| DOWANOL PM | 40 |
| Charge #5 | |
| De-ionized water | 250 |

Example 12

Waterborne Basecoat With Triblock Copolymer 1 and CPO Additives

Thermoplastic polyolefin substrates were cleaned with aliphatic hydrocarbon substrates, and then BYK-3560 was wiped onto the substrates to increase the surface energy. The material of Example 11 was added into a waterborne basecoat, Envirobase HP T472 fine lenticular metallic, commercially available from PPG Industries, at 20% based on total weight, and applied to the pre-cleaned substrates to full opacity. The final coatings were baked at 60° C. for 30 minutes after a clearcoat composition, DC4010, commercially available from PPG Industries, was applied. Cross hatch adhesion testing was done at 20 hours and 5 days post cure, as reported in Table 16, with the basecoat having the additive of Example 11 passing and failure by a basecoat without additive (control).

TABLE 16

| Panels | Cross hatch adhesion |
| --- | --- |
| Basecoat with Triblock Copolymer/CPO Additive of Example 11 | 98% |
| Control basecoat | 0% |

Example 13

Triblock Copolymer 4 Synthesis

A triblock copolymer was prepared using the materials listed in Table 17. Charge #1 was added into a 2L four-neck glass flask equipped with a condenser, temperature measuring probe, mechanical stirring device, and monomer/initiator feeding inlet. The mixture was degassed by purging with nitrogen at room temperature for 30 minutes while stirring. Then the mixture was heated to 85° C., and at 85° C., and charges #2 and #3 were fed into the reactor over 1 hour with a 30 minute hold half way through feed. The reaction mixture was held for 1 hour after the feed, and then charge #4 was charged into the reactor over 10 min and the reaction mixture was held for 1 hour. Charges #5 and #6 were then fed into the reactor over 30 minutes, and the reaction mixture was held for 1 hour before feeding #7 and #8 over 2.5 hours. The reaction mixture was held for 2 hours before charging #9 and #10 into the reactor over 1 hour. The reaction mixture was held for 2 hours before cooling down. The final solids was 57.7% by weight.

TABLE 17

| Ingredients | Parts by Weight |
|---|---|
| Charge #1 | |
| DOWANOL PM | 90 |
| BM1442[5] | 9 |
| Charge #2 | |
| Acrylic acid | 50 |
| Charge #3 | |
| VAZO 67 | 0.25 |
| DOWANOL PM | 10 |
| Charge #4 | |
| VAZO 67 | 0.30 |
| DOWANOL PM | 40 |
| Charge #5 | |
| Isobornyl acrylate | 50 |
| Charge #6 | |
| VAZO 67 | 0.1 |
| DOWANOL PM | 20 |
| Charge #7 | |
| Isobornyl acrylate | 304 |
| Methyl ethyl ketone | 200 |
| Charge #8 | |
| VAZO 67 | 0.61 |
| Methyl ethyl ketone | 50 |
| Charge #9 | |
| Hydroxyethyl acrylate | 45.9 |
| Charge #10 | |
| VAZO 67 | 0.14 |
| Methyl ethyl ketone | 10 |

[5]BM1442 is 2-cyanobutan-2-yl dodecyl carbonotrithioate, supplied by Boron Molecular.

Example 14

Aqueous Dispersion of Triblock Copolymer and Non-CPO

A dispersion was produced from the materials listed in Table 18 by placing Charge #1 into a 1 L flask, and then vacuuming off methyl ethyl ketone, DOWANOL PM and xylene brought by the Triblock Copolymer 4 of Example 13 and a non-chlorinated polyolefin (Eastman Adhesion Promoter 550-1). After over 90% of the solvents were stripped off, Charge #2 was added into the flask and then the mixture was heated to 70° C. until totally dissolved. After totally dissolved, Charge #3 was added into the mixture, and then followed by Charge #4. Charge #5 was added into the mixture with mixing. The solvents were vacuumed off, and a stable dispersion at 24.1% solids content was obtained.

TABLE 18

| Ingredients | Parts by Weight |
|---|---|
| Charge #1 | |
| Triblock Copolymer 4 of Example 13 | 200 |
| Eastman Adhesion Promoter 550-1[4] | 47 |
| Charge #2 | |
| Methyl ethyl ketone | 100 |
| Charge #3 | |
| Triethyl amine | 26 |
| Charge #4 | |
| DOWANOL PM | 150 |
| Charge #5 | |
| De-ionized water | 700 |

[4]A non-chlorinated polyolefin

Example 15

Waterborne Basecoat With Triblock Copolymer 4 and Non-CPO Additives

Thermoplastic polyolefin substrates were cleaned with aliphatic hydrocarbon substrates, and then BYK-3560 was wiped onto the substrates to increase the surface energy. The material of Example 14 was added into a waterborne basecoat, Envirobase HP T472 fine lenticular metallic, commercially available from PPG Industries, at 20% based on total weight, and applied to the pre-cleaned substrates to full opacity. The final coatings were baked at 60° C. for 30 minutes after clearcoat, DC4010, commercially available from PPG Industries, was applied. Cross hatch adhesion testing was done of the coatings and a control coating (without the copolymer/CPO additive) at 20 hours and 5 days post cure as reported in Table 19.

TABLE 19

| Panels | Cross hatch adhesion |
|---|---|
| Basecoat Triblock Copolymer/non-CPO Dispersion of Example 14 | 36% |
| Control basecoat | 0% |

Example 16

Triblock Copolymer with Non-CPO Additive

Material was prepared using the components listed in Table 20. Charge #1 was added into a 500 mL four-necked glass flask equipped with a condenser, temperature measuring probe, mechanical stirring device, and monomer/initiator feeding inlet. The mixture was heated to 80° C. and then charge #2 was slowly added into the flask over 30 minutes. The non-CPO dispersion with triblock copolymer was formed after mixing for 30 minutes.

TABLE 20

| Ingredients | Parts by Weight |
|---|---|
| Charge #1 | |
| Triblock Copolymer 1 of Example 1 | 100 |
| Toluene | 50 |

TABLE 20-continued

| Ingredients | Parts by Weight |
|---|---|
| Charge #2 | |
| Eastman Adhesion Promoter 550-1 | 67 |

Example 17

Solvent Borne Primer With Triblock Copolymer 1 and Non-CPO Additive

Thermoplastic polyolefin substrates were pre-cleaned with an aliphatic hydrocarbon mixture. A two-component isocyanate based primer composition, D8505/DP4000, commercially available from PPG Industries, Inc. in Europe, was prepared using the material of Example 16 (20 wt. % Triblock Copolymer 1 as a reactant) and the primer was applied to the pre-cleaned substrates. The primer was cured for 30 minutes at 60° C.

After 7 days' ambient cure, cross hatch adhesion testing was performed as reported in Table 21. The primer with triblock copolymer and non-chlorinated polyolefin passed the cross hatch adhesion test, while the control primer (without copolymer and non-chlorinated polyolefin) failed.

TABLE 21

| Panels | Cross hatch adhesion |
|---|---|
| Primer with Triblock Copolymer and non-CPO Additive of Example 16 | 100% |
| Control primer | 0% |

The present invention further includes the subject matter of the following clauses.

Clause 1: A coating composition comprising a resinous binder prepared from a reaction mixture comprising: (a) a first component; (b) a second component; and (c) a third component comprising a block copolymer having (i) a first block comprising units having functional groups reactive with at least one of the first and second components and (ii) a second block comprising units having functional groups that promote adhesion to a polymeric substrate, provided that the first component, the second component, and the block copolymer differ from each other.

Clause 2: The coating composition of clause 1, wherein the first component comprises a polyol and the second component comprises an isocyanate, and the copolymer first block comprises units having functional groups reactive with the isocyanate.

Clause 3: The coating composition of clauses 1 or 2, wherein the second block comprises cycloalkyl(meth)acrylate or aryl(meth)acrylate units.

Clause 4: The coating composition of any of the preceding clauses, wherein the second block comprises isobornyl(meth)acrylate units.

Clause 5: The coating composition of any of the preceding clauses, wherein the first block comprises hydroxyl functional (meth)acrylic acid alkyl esters.

Clause 6: The coating composition of any of the preceding clauses, wherein the first block further comprises non-hydroxy functional (meth)acrylic acid alkyl esters.

Clause 7: The coating composition of any of the preceding clauses, wherein component (c) further comprises a third block comprising (meth)acrylic acid units.

Clause 8: The coating composition of any of the preceding clauses, wherein component (c) comprises up to 50 wt. % of the resinous binder based on total solids.

Clause 9: A method of treating a plastic substrate comprising steps of (1) cleaning at least a portion of a plastic substrate, (2) applying the coating composition of any one of the clauses 1-8 directly onto the cleaned portion, wherein step (2) directly follows step (1) with no steps in between.

Clause 10: The method of clause 9, wherein the plastic substrate comprises a thermoplastic olefin.

Clause 11: The method of any one of the clauses 9 or 10, further comprising applying a second coating composition directly onto the coating composition of claim 1.

Clause 12: The method of clause 11, wherein the second coating composition comprises a basecoat composition and/or a clearcoat composition.

Clause 13: A method of treating a plastic substrate comprising (1) cleaning at least a portion of a plastic substrate, (2) treating the cleaned portion with an adhesion promoter and (3) applying a coating composition directly onto the treated portion, wherein steps (2) and (3) directly follow step (1) with no steps in between steps (1) and (2) or steps (2) and (3), wherein the coating composition comprises a film-forming polymer and wherein at least (i) one of the adhesion promoter and (ii) the coating composition comprises an adhesion promoting additive, the adhesion promoting additive comprising a block copolymer comprising (a) a first block and (b) a second block comprising units having functional groups that promote adhesion to the plastic substrate.

Clause 14: The method of clause 13 wherein the first block comprises hydroxyl groups.

Clause 15: The method of clauses 13 or 14 wherein the adhesion promoting functional groups of the second block comprise cycloalkyl(meth)acrylate or aryl(meth)acrylate units.

Clause 16: The method of any one of the clauses 13-15 wherein the adhesion promoting functional groups of the second block comprise isobornyl(meth)acrylate units.

Clause 17: The method of any one of the clauses 13-16, further comprising applying a clearcoat composition directly onto the coating composition, wherein the clearcoat composition is reactive with the functional groups of the first block.

Clause 18: The method of any one of the clauses 13-17, wherein the plastic substrate comprises a thermoplastic olefin.

Clause 19: The method of any one of the clauses 13-18, wherein the coating composition comprises a basecoat coating composition.

Clause 20: A coating composition comprising (i) a film-forming polymer, (ii) adhesion promoter, and (iii) a block copolymer.

Clause 21: The coating composition of clause 20, wherein one block of the copolymer comprises cycloalkyl(meth)acrylate or aryl(meth)acrylate units.

Clause 22: The coating composition of any one of the clauses 20 or 21, wherein said block of the copolymer comprises isobornyl(meth)acrylate units.

Clause 23: The coating composition of any one of the clauses 21-22, wherein another block of the copolymer comprises hydroxy functional (meth)acrylic acid alkyl esters.

Clause 24: The coating composition of any one of the clauses 21-23, wherein the other block of the copolymer further comprises non-hydroxy functional (meth)acrylic acid alkyl esters.

Clause 25: The coating composition of any one of the clauses 21-24, wherein a third block of the copolymer comprises (meth)acrylic acid units.

Clause 26: A method of treating a plastic substrate comprising applying the coating composition of any one of the clauses 20-25 directly onto at least a portion of an untreated plastic substrate.

Clause 27: The method of clause 26, further comprising applying directly onto the coating composition, a second coating composition with no coating steps in between, where the second coating composition may comprise a clearcoat composition.

Clause 28: The method of any one of the clauses 26 or 27, further comprising pre-cleaning the plastic substrate prior to applying the basecoat coating composition.

Clause 29: A plastic substrate comprising a coating deposited from the coating composition of any of the clauses 1-8 and 20-25.

Clause 30: Use of a coating composition of any one of the clauses 1-8 and 20-25 to improve the adhesion of coating layers applied to a plastic substrate.

Whereas particular aspects of this invention have been described above for purposes of illustration, it will be evident to those skilled in the art that numerous variations of the details of the present invention may be made without departing from the invention as defined in the appended claims.

The invention claimed is:

1. A coating composition comprising a resinous binder prepared from a reaction mixture comprising:
(a) a first component; (b) a second component; and (c) a third component comprising a block copolymer having (i) a first block comprising units having functional groups reactive with at least one of the first and second components, (ii) a second block comprising units having functional groups that promote adhesion to a polymeric substrate, and (iii) a third block comprising (meth)acrylic acid units, provided that the first component, the second component, and the block copolymer differ from each other, and
wherein the first and second components react with each other and the first and/or second components react with the first block of the third component comprising the block copolymer.

2. The coating composition of claim 1, wherein the first component comprises a polyol and the second component comprises an isocyanate, and the copolymer first block comprises units having functional groups reactive with the isocyanate.

3. The coating composition of claim 1, wherein the second block comprises cycloalkyl(meth)acrylate or aryl(meth)acrylate units.

4. The coating composition of claim 3, wherein the second block comprises isobornyl(meth)acrylate units.

5. The coating composition of claim 1, wherein the first block comprises hydroxyl functional (meth)acrylic acid alkyl esters.

6. The coating composition of claim 5, wherein the first block further comprises non-hydroxy functional (meth)acrylic acid alkyl esters.

7. The coating composition of claim 1, wherein component (c) comprises up to 50 wt. % of the resinous binder based on total solids.

8. A method of treating a plastic substrate comprising (1) cleaning at least a portion of a plastic substrate, (2) applying the coating composition of claim 1 directly onto the cleaned portion, wherein step (2) directly follows step (1) with no steps in between.

9. The method of claim 8, wherein the plastic substrate comprises a thermoplastic olefin.

10. The method of claim 8, further comprising applying a second coating composition directly onto the coating composition of claim 1.

11. The method of claim 10, wherein the second coating composition comprises a basecoat composition and/or a clearcoat composition.

12. A method of treating a plastic substrate comprising (1) cleaning at least a portion of a plastic substrate, (2) treating the cleaned portion with an adhesion promoter and (3) applying a coating composition directly onto the treated portion, wherein steps (2) and (3) directly follow step (1) with no steps in between steps (1) and (2) or steps (2) and (3), wherein the coating composition comprises
(i) a film-forming polymer, (ii) an adhesion promoter, and (iii) a block copolymer, wherein components (i), (ii), and (iii) are different from each other and the block copolymer comprises a first block, a second block, and a third block, and wherein the third block comprises (meth)acrylic acid units.

13. The method of claim 12, wherein the first block comprises hydroxyl groups.

14. The method of claim 12, wherein the adhesion promoting functional groups of the second block comprise cycloalkyl(meth)acrylate or aryl(meth)acrylate units.

15. The method of claim 14, wherein the adhesion promoting functional groups of the second block comprise isobornyl(meth)acrylate units.

16. The method of claim 12, further comprising applying a clearcoat composition directly onto the coating composition, wherein the clearcoat composition is reactive with functional groups of the first block.

17. The method of claim 12, wherein the plastic substrate comprises a thermoplastic olefin.

18. The method of claim 12, wherein the coating composition comprises a basecoat coating composition.

19. A coating composition comprising (i) a film-forming polymer, (ii) an adhesion promoter, and (iii) a block copolymer,
wherein components (i), (ii), and (iii) are different from each other and the block copolymer comprises a first block, a second block, and a third block, and
wherein the third block comprises (meth)acrylic acid units.

20. The coating composition of claim 19, wherein one block of the copolymer comprises cycloalkyl(meth)acrylate or aryl(meth)acrylate units.

21. The coating composition of claim 20, wherein said block of the copolymer comprises isobornyl(meth)acrylate units.

22. The coating composition of claim 20, wherein another block of the copolymer comprises hydroxy functional (meth)acrylic acid alkyl esters.

23. The coating composition of claim 22, wherein said other block of the copolymer further comprises non-hydroxy functional (meth)acrylic acid alkyl esters.

24. A method of treating a plastic substrate comprising applying the coating composition of claim 19 directly onto at least a portion of a plastic substrate.

25. The method of claim 24, further comprising applying directly onto the coating composition, a second coating composition with no coating steps in between.

26. The method of claim 24, further comprising pre-cleaning the plastic substrate prior to applying the coating composition.

\* \* \* \* \*